Jan. 27, 1925.

H. THORNE 1,524,493

PEDAL LOCKING MEANS FOR AUTOMOBILES

Filed July 10, 1924    2 Sheets-Sheet 1

INVENTOR:
Harold Thorne,
BY
ATTORNEY

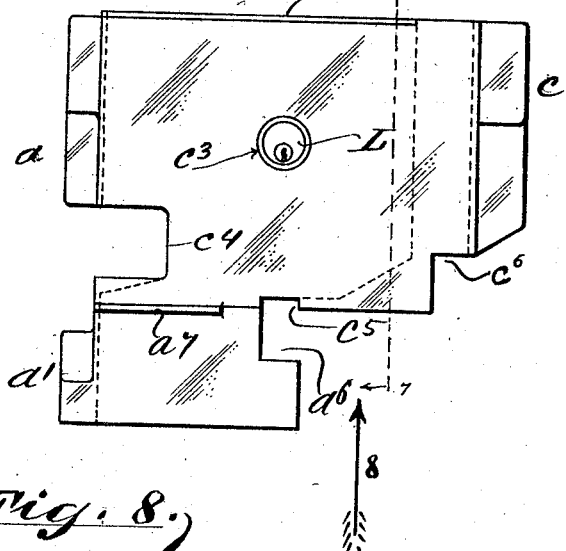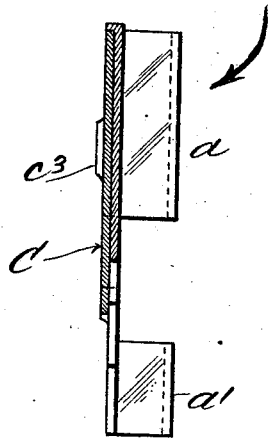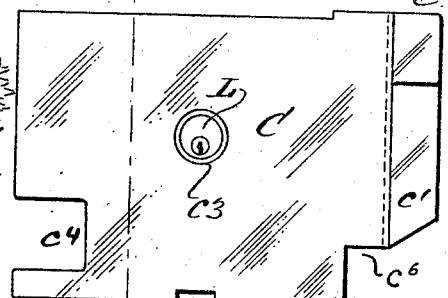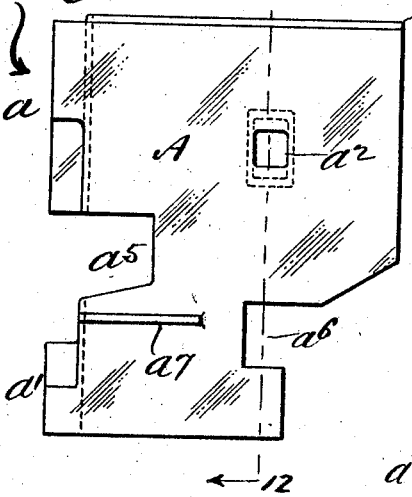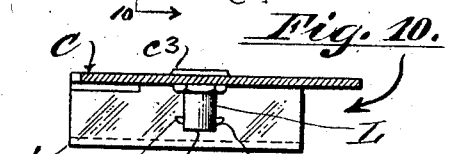

Patented Jan. 27, 1925.

1,524,493

UNITED STATES PATENT OFFICE.

HAROLD THORNE, OF NEW YORK, N. Y.

PEDAL-LOCKING MEANS FOR AUTOMOBILES.

Application filed July 10, 1924. Serial No. 725,132.

*To all whom it may concern:*

Be it known that I, HAROLD THORNE, a subject of the King of England, and a resident of the borough of Manhattan, city, county, and State of New York, have invented certain new and useful Improvements in Pedal-Locking Means for Automobiles, of which the following is a specification, sufficient to enable those skilled in the art to which the invention appertains to utilize the same.

While applicable to automobiles generally in a broad sense, my improved pedal locking device, considered in a unitary sense, is designed primarily and especially for use in conjunction with automobiles of the Ford type, and is so illustrated herein, the object being to afford simple, inexpensive, but positive means for securely clasping and holding the pedals of such a car against clandestine movement, said means being essentially independent of the car, and self-contained in that application to or removal from the foot board thereof may be accomplished expeditiously, and without alteration or addition to the foot board, pedals, or any other part of the car, all as hereinafter fully set forth,—the invention consisting in the specific construction, combination and arrangement of parts and appurtenances described and claimed, and a distinctive feature being the provision of superimposable, interlocking clasp plates adapted to engage with the sides of the pedal slots in the foot board in such manner as to prevent movement of said pedals while my clasp plates are in position thereby safe-guarding the car against surreptitious manipulation or movement. In other words, my superimposable pedal clasp plates may be detachably and automatically secured in position on the foot board of a Ford automobile by means independent of the latter, so that my device is adapted for use on any car of the type named, without alteration or special preparation of any part of the car or locking mechanism, and can only be released by a key specially provided for the purpose,— the two clasp plates when superposed and locked together constituting a unitary integral structure, and incidentally for the time being becoming essentially a component part of the foot board of the car.

In the accompanying drawings I illustrate a practical embodiment of the essential features of my invention as applied to the foot board of an automobile of the Ford type, although I do not limit myself to the identical form and construction of parts and appurtenances shown herein by way of exemplification, since changes in minor details may be made, and equivalent mechanical expedients resorted to, with like results, and without departing from the spirit and intent of my invention in this respect.

With this understanding:—

Fig. 6 is a face view, upon a larger scale, of my pedal clasp plates, superposed;

Fig. 7 is a section thereof taken upon plane of line 7—7, Fig. 6;

Fig. 8 is an elevation of the clasp plates superposed as in Fig. 6, and looking in the direction indicated by the arrow 8;

Fig. 9 is an elevation of the upper or lock plate of the combination;

Fig. 10 is a section thereof, taken upon plane of line 10—10, Fig. 9;

Fig. 11 is an elevation of the lower clasp and socket plate of the combination;

Fig. 12 is a section thereof, taken upon plane of line 12—12, Fig. 11.

Figure 1:
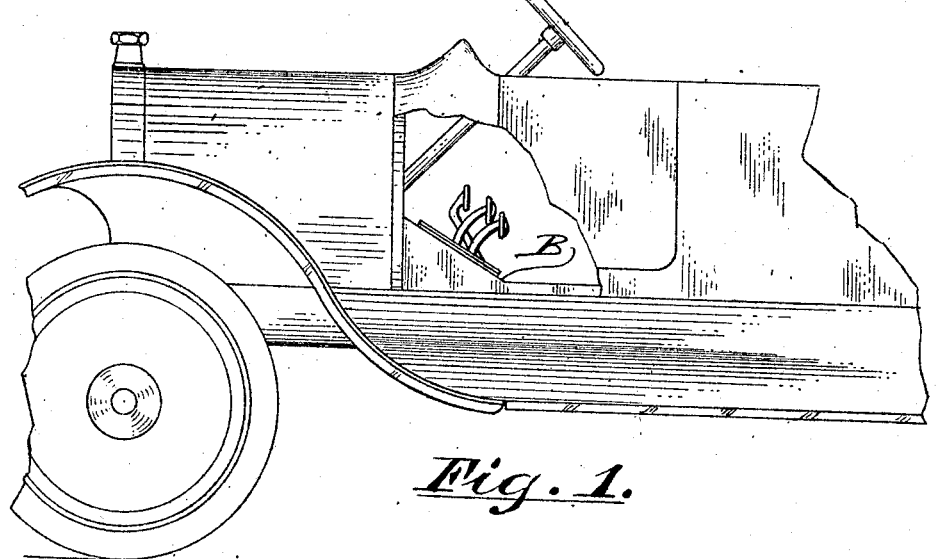
Fig. 1 represents diagrammatically the localization and application of my superimposable pedal clasp plates on the foot board of a car of the character designated.
Figures 2, 3:
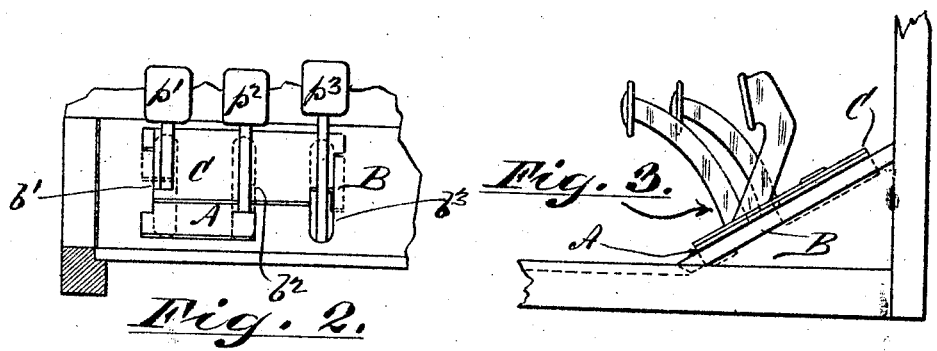
Fig. 2 is a sectional elevation, upon a larger scale, showing the face of the foot board and pedals; with my superposed pedal clasp plates in functional position.
Fig. 3 is a sectional side elevation of the parts as shown in Fig. 2.
Figure 4:
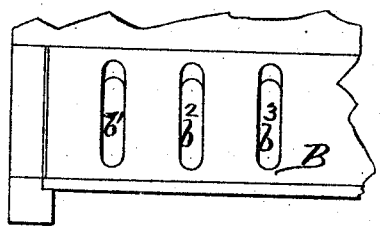
Fig. 4 is a view of the upper side of a portion of the foot board, showing the pedal slots, without the pedal.
Figure 5:
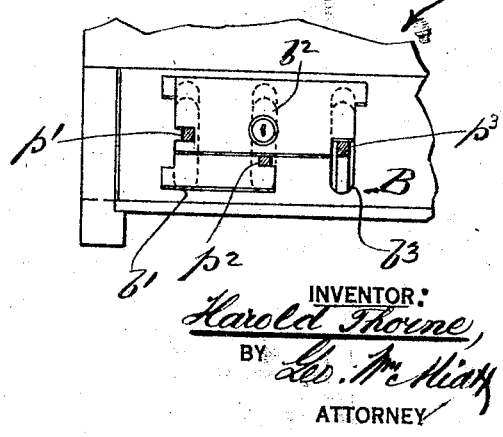
Fig. 5 is a similar view, showing my superposed clasp plates in position on the foot board, the pedals being shown in cross section.

The foot board B, is formed with the usual three parallel pedal slots, $b'$, for the gear pedal $p'$, $b^2$, for the reverse pedal $p^2$, and $b^3$, for the brake pedal $p^3$, said slots and pedals being of usual construction, and functioning as heretofore in a manner well known in the prior state of the art, so that description of operation is not necessary in this respect, my invention relating solely to extraneous means for securely holding said pedals in prescribed positions assumed thereby when the car is at rest.

To this end, my contrivance consists of two superimposable clasp plates,—a base or bottom plate A, resting directly upon the upper side of the foot board B, and formed with rectangular edge flanges $a'$, $a'$, adapted to fit in the pedal slot $b'$, and under one longitudinal edge thereof, and a top or cap plate C, fitting over said base plate A, and formed with rectangular edge flanges $c$, $c'$, adapted to fit in the pedal slot $b^3$, and under one longitudinal edge thereof, so that when the two plates A and C are secured together in superposed position on the foot board B, they form practically a unitary structure that cannot be removed from said foot board, nor shifted thereon until released from such copulative connection.

This releasable copulative connection between the two clasp plates A and C, is preferably effected by means of a snap lock L, of the Yale type, or the equivalent thereof, mounted in an embossment $C^3$, formed for the purpose in the upper or cap plate C, the barrel $l$, in said lock L, fitting in a socket $a^2$, formed for the purpose in the base plate A, said socket $a^2$, having shoulders $a^4$, $a^4$, for engagement with the latches $l'$, $l'$, of the lock L.

The offset $a^5$, in the base plate A, and the offset $c^4$, in the cap plate C, are for the accommodation and engagement with the gear pedal $p'$; the offset $a^6$, in the base plate A, and the offset $c^5$, in the cap plate C, are for the accommodation of and engagement with the reverse pedal $p^2$, whereas the brake pedal $p^3$, is held stationary by the offset $c^6$, of the cap plate C; or any substantially similar combination and arrangement of offsets for engagement with the pedals may be resorted to with like results,—the gist of the invention consisting essentially in the superposed clasp plates and means for temporarily uniting them, one plate being formed for flange engagement with a side of the pedal slot $b'$, and the other plate being formed for flange engagement with a side of the pedal slot $b^3$, whereby the said plates A and C, may be independently slipped into position and then united integrally for the time being, substantially as herein set forth.

The base plate A, may be formed with parallel shoulders $a^7$, $a^8$, on its upper surface between which the corresponding edges of the cap plate C, may fit, thereby facilitating superposition and alignment of the cap plate upon the base plate.

What I claim as my invention and desire to secure by Letters Patent, is:—

1. In pedal locking means of the character designated, the combination with a foot board formed with pedal slots, of two superimposable clasp plates formed with flanges fitting within the outer pedal slots and under the edges thereof, said clasp plates being relatively recessed and shouldered to engage and hold the pedals in prescribed positions, substantially in the manner and for the purpose set forth.

2. In pedal locking means of the character designated, the combination with a foot board formed with pedal slots, of two superimposed clasp plates formed with flanges fitting within the outer pedal slots and under the edges thereof, said clasp plates being relatively recessed and shouldered to engage and hold the pedals in prescribed positions, together with means for temporarily securing said clasp plates together, substantially in the manner and for the purpose set forth.

3. In pedal locking means of the character designated, the combination with a foot board formed with pedal slots, of two superimposable clasp plates formed with flanges fitting within the outer pedal slots and under the edges thereof, said clasp plates being relatively recessed and shouldered to engage and hold the pedals in prescribed positions, together with a snap lock adapted to temporarily secure said clasp plates together, substantially in the manner and for the purpose set forth.

4. A pedal locking means of the character designated, the combination with a foot board formed with pedal slots, of two superimposable clasp plates formed with flanges fitting within the outer pedal slots and under the edges thereof, said clasp plates being relatively recessed and shouldered to engage and hold the pedals in prescribed positions, together with a key-controlled lock adapted to temporarily secure said clasp plates together, substantially in the manner and for the purpose set forth.

HAROLD THORNE.

Witnesses:
 GEO. WM. MIATT,
 MATHILDA STENERNAGEL.